United States Patent [19]
Webb

[11] 4,048,872
[45] Sept. 20, 1977

[54] CONTROL COUPLINGS
[75] Inventor: Oswald Webb, Whitley, England
[73] Assignee: GKN Transmissions Limited, Erdington, England
[21] Appl. No.: 581,690
[22] Filed: May 28, 1975
[30] Foreign Application Priority Data
May 28, 1974    United Kingdom .............. 23526/74
[51] Int. Cl.² .............................................. F16H 1/44
[52] U.S. Cl. ......................................... 74/711; 64/26; 74/710.5; 192/82 T; 192/35; 403/DIG. 7
[58] Field of Search ..................... 64/26, 29; 74/710.5, 74/711, 701, 705; 192/82 T, 35; 403/DIG. 7

[56]            References Cited
        U.S. PATENT DOCUMENTS

| 858,131 | 6/1907 | Aichele | 403/DIG. 7 |
|---|---|---|---|
| 1,771,949 | 7/1930 | Blanchard | 403/DIG. 7 |
| 2,382,291 | 8/1945 | Carlberg | 403/DIG. 7 |
| 3,760,922 | 9/1973 | Rolt | 74/710.5 |
| 3,845,671 | 11/1974 | Sharp | 74/711 |
| 3,869,940 | 3/1975 | Webb et al. | 74/711 |
| 3,923,113 | 12/1975 | Pagdin | 74/711 |

Primary Examiner—Samuel Scott
Assistant Examiner—Randall Heald
Attorney, Agent, or Firm—Spencer & Kaye

[57]            ABSTRACT

A control coupling in which an enclosure houses first and second sets of mutually interleaved elements in a viscous liquid. The first and second sets of elements are arranged for rotation about a common axis and for driving connection with first and second rotatable members respectively. A clutch is provided outside the enclosure and resilient means are arranged to urge the clutch into a disengaged state. A pressure responsive means which is in communication with the enclosure is arranged to engage the clutch against the action of the resilient means when the pressure in the liquid in the enclosure attains a predetermined level.

11 Claims, 4 Drawing Figures

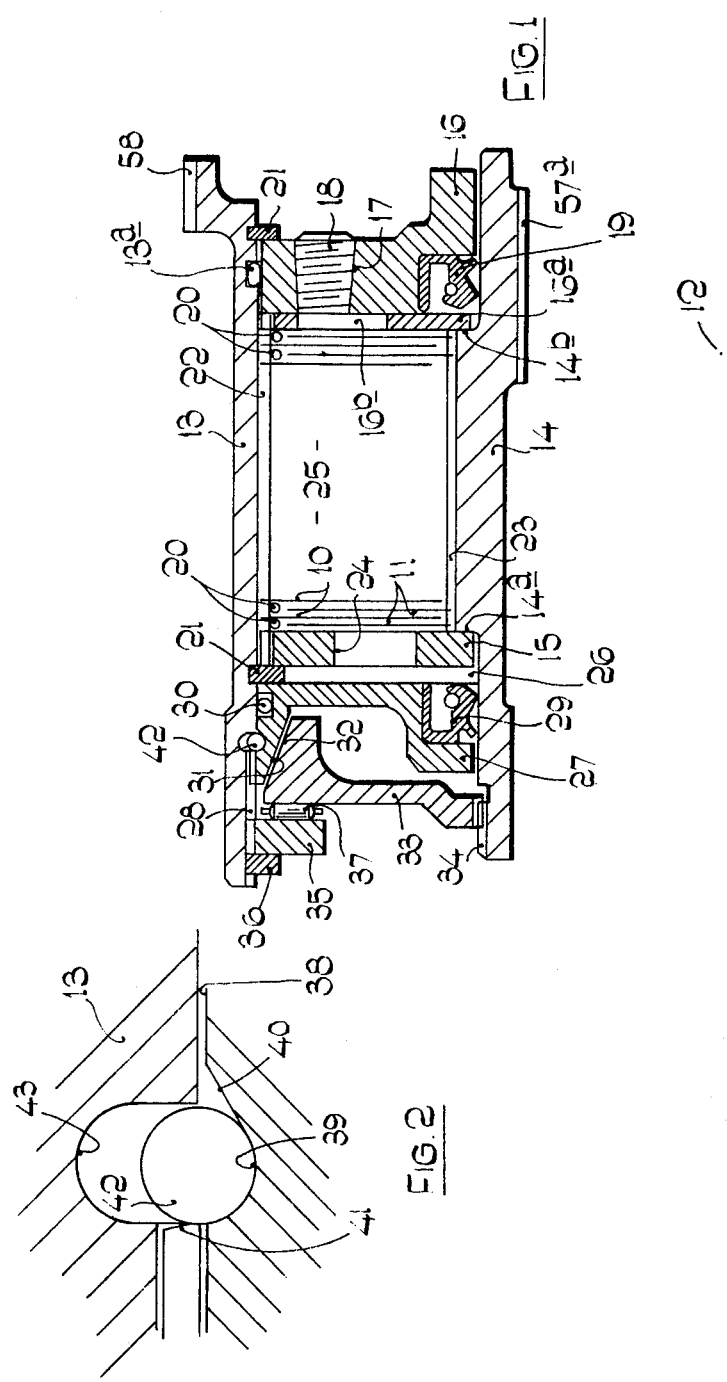

CONTROL COUPLINGS

BACKGROUND OF THE INVENTION

This invention relates to devices for controlling or limiting differences in angular velocity or angular acceleration between relatively rotatable members. Hereinafter such a device is referred to as "a control coupling". Control couplings are particularly useful in controlling the relative rotation between parts of a differential gear and particularly in controlling such a differential gear when used as an interaxle differential in a four-wheel drive vehicle.

More particularly, the invention is concerned with a control coupling, hereinafter referred to as being of the kind specified, comprising mutually interleaved elements arranged for rotation about a common axis within an enclosure containing a viscous liquid in contact with adjacent working surfaces of said elements, alternate ones of said elements constituting a first set of elements for driving connection with a first rotatable member and remaining ones of said elements constituting a second set of elements for driving connection with a second rotatable member. In such a coupling, the liquid within the enclosure and the construction thereof will be such that, at a predetermined working temperature of at least 100° C, the pressure of the liquid in the enclosure rises substantially above ambient for the reasons explained below.

When such a coupling is in use, energy will be dissipated in the coupling which will cause a rise in temperature thereof. The rise in temperature causes expansion of the liquid and the co-efficient of thermal expansion of the liquid is so much greater than that of the material of the coupling that, at a predetermined temperature, the liquid substantially fills the space available for fluid within the coupling enclosure. When the liquid fills the coupling we have found that the pressure of liquid within the coupling also rises.

SUMMARY OF THE INVENTION

According to a first aspect of the invention we provide a control coupling of the kind specified including a clutch outside the enclosure, resilient means urging the clutch to a disengaged state and pressure responsive means in communication with the enclosure and arranged to engage the clutch against the action of the resilient means upon the attainment of a predetermined pressure in the liquid in the enclosure.

In a coupling embodying the invention, if the rate of heat dissipation causes a rise in temperature in the enclosure such that the liquid fills the enclosure and the pressure therein rises, there will come a time when the effect of the pressure will be sufficient to overcome the resilient means and the clutch will be engaged thus reducing the dissipation of heat in the coupling and allowing the latter to cool and the pressure therein to drop. If the pressure drops sufficiently then the clutch will become disengaged and the control coupling will once again operate as a viscous shear coupling.

The torque transmitting characteristic of a coupling embodying the invention is particularly useful when used to control an inter-axle differential in a four-wheel drive vehicle. Thus, should there be some failure of the drive element from the differential to one of the axles, the resultant rise in temperature in the coupling will ultimately cause engagement of the clutch and the other axle will continue to drive. Moreover, should there be a failure of the front or rear brakes of the four-wheel drive vehicle having an inter-axle differential controlled by a coupling embodying the invention, the non-braked wheels will tend to be retarded due to the torque transmitted by the coupling when the clutch is engaged.

The clutch may be a cone clutch, a dog clutch or any other convenient form of clutch. In a preferred construction, the elements are carried by concentric cylindrical walls which form the inner and outer walls of the enclosure and one of the end walls of the enclosure is annular and is slidable between the cylindrical walls and constitutes, or forms part of, the pressure responsive means.

Where, as is preferred, a cone clutch is provided the one end wall is fixed against rotation relative to one of the cylindrical walls and carries one part of the cone clutch, the other part of the cone clutch being carried by the other cylindrical wall. A bearing may be provided carried by the one cylindrical wall to support said other part of the clutch.

The resilient means may be in the form of a spring ring engaging a groove in the one end wall, the groove being shaped to cause expansion of the ring and to permit movement of the one end wall when the total force on the end wall due to the pressure in the enclosure is sufficient to cause expansion of the ring.

If the elements of one of said sets are free to move in directions parallel to said common axis, then the rise in pressure which occurs when the enclosure is full causes axial movement of the elements which are movable so that adjacent elements from the two sets come into contact and the coupling acts in the manner of a wet clutch thus augmenting the operation of the clutch outside the enclosure. If desired the elements of each set may be free to move in directions parallel to said common axis and the elements of one or both sets may be provided with working surfaces in the form of facings of friction material.

According to another aspect of the invention we provide a control coupling according to the first aspect of the invention in combination with a differential gear and in which the first and second sets of elements are drivingly connected to two relatively rotatable elements of the gear.

According to a further aspect of the invention, we provide a four-wheel drive vehicle having front and rear driven axles and including the combination of the preceding paragraph, the differential gear having two outputs which are connected to the front and rear driven axles respectively.

BRIEF DESCRIPTION OF THE DRAWINGS

The present invention will now be described, by way of example with reference to the accompanying drawings wherein:

FIG. 1 is a part-sectional elevation of a control coupling in accordance with the present invention;

FIG. 2 is a detail view of the resilient means for holding the clutch disengaged;

DESCRIPTION OF THE PREFERRED EMBODIMENT

Figure 3:
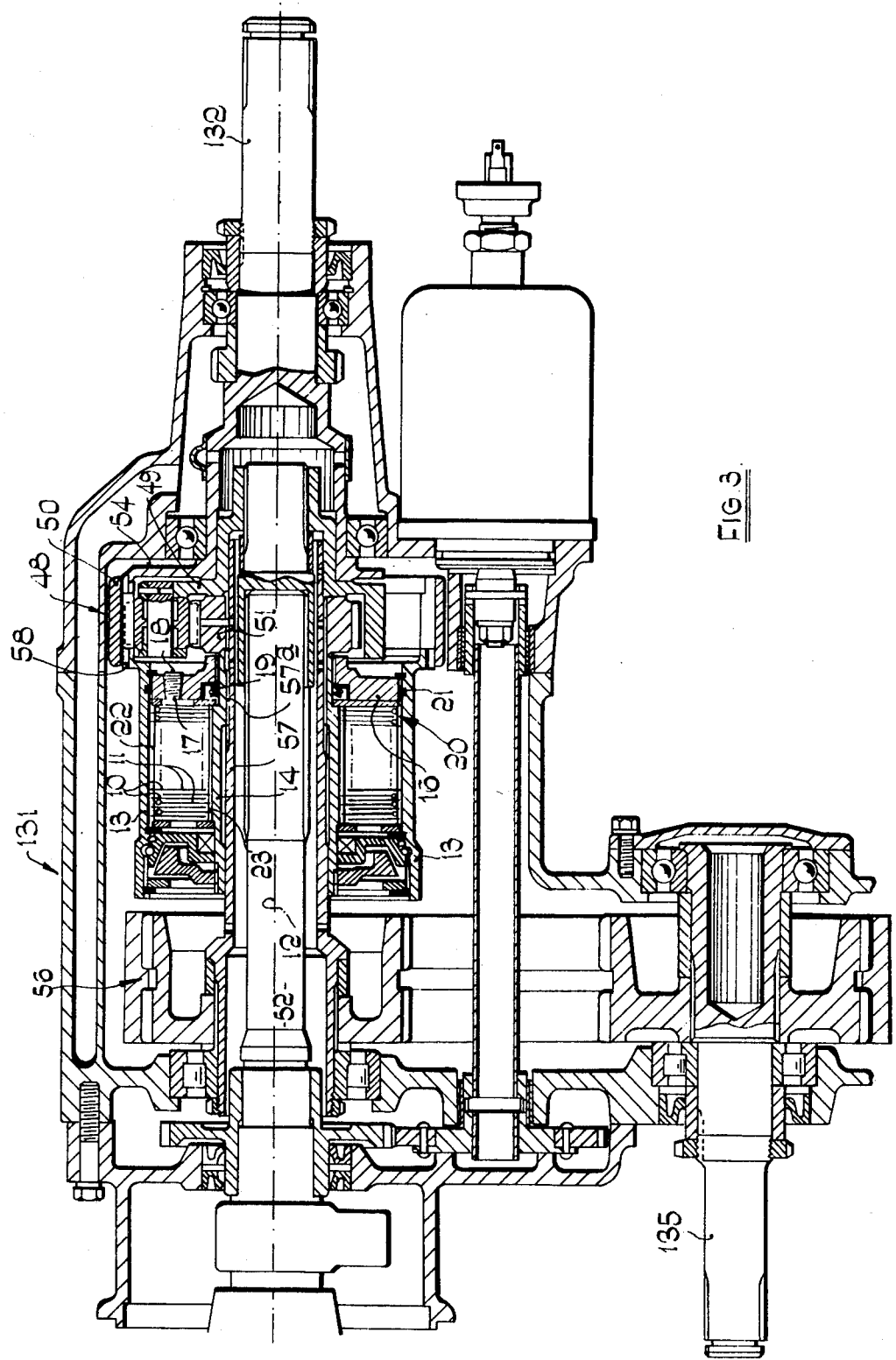
FIG. 3 is a sectional elevation of part of a motor vehicle transmission incorporating a control coupling in accordance with the present invention.

In FIG. 1 of the drawings, a control coupling for limiting freedom of differential action of an interaxle differential gear in a motor vehicle transmission (an example if which is hereinafter described) consists of mutually spaced and mutually interleaved elements in the form of "outer" and "inner" annular plates 10 and 11 respectively, the plates 10, 11 being arranged for rotation about a common axis 12 within an enclosure 25 defined by relatively rotatable mutually concentric, generally cylindrical walls 13 and 14 and end walls 16 and 27. An end plate 15 is located adjacent the end wall 27. The enclosure contains a viscous fluid (not illustrated) admitted by way of a filling hole 17 in the end wall 16 and which is closed by a plug 18. The right hand end of the enclosure is sealed by a seal 19 between the cylindrical wall 14 and the end wall 16 and an O-ring 13a between the end wall 16 and the cylindrical wall 13. A plate 16a is provided within the enclosure 25 adjacent the end wall 16, the plate 16a is apertured at 16b to allow communication between the hole 17 and the enclosure to the left of the plate 16a. The wall 14 is axially located relative to the wall 13 by retaining rings 21 which prevent the axially outward movement of the plates 15 and 16a and the end wall 16, by shoulder 14a on the wall 14 which prevents axially inward movement of the plate 15 and by the shoulder 14b on the wall 14 which similarly prevents axially inward movement of the plate 16a and end wall 16.

The outer plates 10 are toothed at their outer peripheries and are in driving engagement with the outer wall 13 by way of axial splines 22 on the inner surface of wall 13. The inner plates 11 are internally toothed and are in driving engagement with the inner wall 14 by way of axial splines 23 on the radially outer surface of wall 14. The walls, 13, 14 are adapted for driving connection with first and second relatively rotatable members constituted by two members of a differential gear as hereinafter explained. The plates 11 of the inner set of plates are free to move in directions parallel to the common axis 12 along the splines but the plates 10 are spaced by spacers 20. The sets of plates 10 and 11 are thus keyed for rotation to the walls 13 and 14 respectively.

The spaces on opposite sides of each of the plates 10, 11 may be in fluid communication by way of openings (not shown) through the working surfaces of the plates. Alternatively the plates may be imperforate.

The end plate 15 is keyed to the splines 22 and located by one of the rings 21 as previously described. An aperture 24 is provided in the plate 15 through which the main part of the enclosure 25 in which the plates 10 and 11 are situated is in communication with an enclosure part 26 defined between the walls 13 and 14, the end plate 15 and the end wall 27. The end wall 27 is splined to further internal splines 28 on the cylindrical wall 13 so as to be keyed to rotate with the wall 13. The end wall 27 can, however, rotate relative to the wall 14 and is sealed to the wall by means of a seal 29 received in a recess in the end wall 27. The end wall 27 also seals with the wall 13 by means of an O-ring received in a recess in the outer surface of the wall.

The end wall 27 is provided with a concave conical surface 31 which forms part of a clutch. The other part of the clutch is formed by a convex conical surface 32 on a member 33 which is splined at 34 to the cylindrical wall 14. One of the surfaces 31, 32 will be formed by a lining of friction material, not shown.

An abutment ring 35 is splined to the splines 28 and is axially located against movement to the left in FIG. 1 by a circlip 36. A roller bearing 37 is interposed between the abutment ring 35 and a radial surface on the member 33.

Referring now to FIG. 2, the outer periphery of the end wall 27 and which is indicated at 38 is formed with a groove 39. The right hand side of the groove in the figure is formed by a gently sloping surface 40 while the left hand side of the groove is formed by a steep and higher surface 41. A spring ring 42 is received in the groove and also in a further groove 43 in the cylindrical wall 13. The ring 42 will normally locate the end wall 27 against movement in either direction parallel to the axis 12. However, a force applied to the end wall 27 to the left in FIG. 1 will, if sufficient, cause the ring 42 to expand as the surface 40 moves within the ring thus causing the ring to retract into the groove 43 and allowing the end wall 27 to move to the left.

The spring 42 normally holds the clutch surfaces 31 and 32 out of engagement. Upon the generation of a predetermined pressure in the enclosure 25, 26, this pressure acts on the end wall 27 through the aperture 24 and moves the end wall 27 to the left against the action of a spring 42 thus engaging the clutch surfaces 31 and 32. The force is reacted by the ring 35 and the bearing 37. When the clutch surfaces 31 and 32 are interengaged the cylindrical walls 13 and 14 are clutched together for rotation.

The enclosure 25, 26 contains the viscous fluid referred to above which is a silicone fluid (e.g. that marketed by the Dow Corning Company as X2-1073) having a nominal viscosity of 30,000 centi-stokes to 60,000 centi-stokes i.e. a viscosity of this value at a temperature of 25° C, and a zero shear rate. The nominal value of viscosity may be above or below these figures depending upon the operating characteristics required, i.e. between 5000 and 100,000 centi-stokes. The fluid is preferably introduced by a vacuum-filling process. After filling, a percentage of the contained fluid is removed, for example by heating the entire coupling to, say 100° C, in order to adjust the torque characteristics by controlling the working temperature at which the pressure developed in the enclosure is sufficient to engage the clutch surfaces 31 and 32.

Normally relative rotation between the cylindrical walls 13 and 14 is controlled by the shear forces in the viscous liquid between the plates 10 and 11. If, however, there is a considerable amount of heat dissipation in the coupling due to relative rotation between the plates 10 and 11, the temperature of the liquid in the coupling will rise and the liquid will ultimately fill all of the enclosure 25, 26. Once the enclosure has been filled, a further rise in temperature will increase the pressure of the liquid and this will have the effect, at a predetermined pressure, of moving the end wall 27 to the left against the action of the spring ring 42. As the end wall 27 moves to the left the surfaces 31 and 32 will come into engagement so that the cylindrical walls 13 and 14 will be clutched together. This will reduce the heat dissipation in the coupling so that the temperature thereof can drop and if the temperature drops sufficiently the pressure will also drop sufficiently to allow the clutch to become disengaged under the action of the spring ring 42.

In the construction described, the action of the clutch 31, 32 will be augmented because the plates 11 are free to move parallel to the common axis 12 and, as the pressure increases the plates 10 and 11 will come into contact and tend to act as a wet clutch. If desired, the spacers 20 could be omitted so that the plates of both sets are free to move axially.

If desired, some means may be provided for relieving the pressure in the coupling in the event that, even when the clutch 31 and 32 has been engaged, the pressure continues to rise.

The characteristic of a coupling embodying the invention is particularly useful when the coupling is applied to control an interaxle differential in a four-wheel drive vehicle. The type of characteristic which is required in such a vehicle is that at small rates of relative rotation between the front and rear wheels there will be little or no torque transmitted between them. Should however, the rate of relative rotation increase then it is desired that the rate of torque transmission shall increase accordingly. With a coupling embodying the invention the torque transmitting capability will increase up to a maximum when the clutch 31, 32 is engaged.

Figure 4:
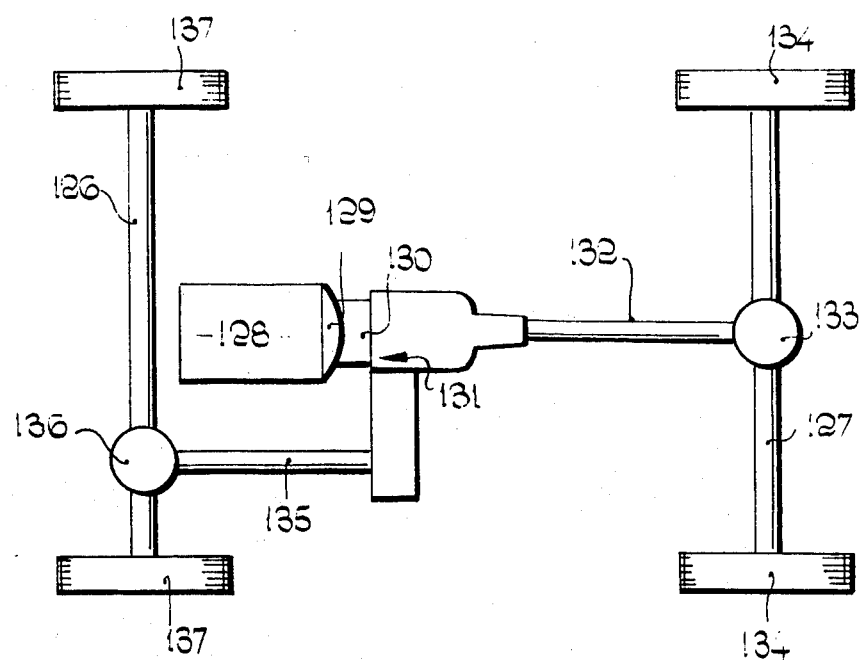
FIG. 4 is a diagram illustrating the application of the transmission of FIG. 3 to a four-wheel drive vehicle.

FIGS. 3 and 4 show the control coupling of FIGS. 1 and 2 applied to control the interaxle differential of a four-wheel drive vehicle shown diagrammatically in FIG. 4. The vehicle comprises a driven front axle 126 and a driven rear axle 127. The prime mover is indicated at 128, a clutch housing at 129, a change speed gearbox at 130 and an assembly of differential gear, control couplings and transfer box at 131. The assembly 131 will be described below in relation to FIG. 3. A drive shaft 132 connects the assembly 131 to an interwheel differential 133 of the rear axle 127 and the rear wheels 134 are driven via the interwheel differential 133. Similarly, a drive shaft 135 extends forwardly from the assembly 131 to an interwheel differential 136 in the front axle 126 from which are driven the front wheels 137.

Referring now to FIG. 3, the control coupling above described is shown incorporated in the assembly 131 which includes an interaxle differential gear 48 for distributing drive to the front and rear pairs of road wheels 137 and 134. The differential gear 48 is of the planetary spur type whereof a planet carrier 49 is the input driven from the prime mover 128, the annulus 50 is the output to the rear set of road wheels 134, and the sun gear 51 is the output to the front set of road wheels 137. The planet carrier is driven by way of an input shaft 52 co-axial with the axis 12 of the differential gear 48. The shaft 132 is connected to the annulus 50 by way of a flange 54 having peripheral teeth engaged with the annulus 50. The shaft 135 is connected to the sun gear 51 by way of a chain and sprocket drive transfer 56 and tubular shaft 57 to which the sun gear is splined. The control coupling is mounted co-axially with the differential gear 48, the outer wall 13 of the coupling having a peripheral toothed flange 58 engaged with the annulus 50. The inner wall 14 of the coupling is splined at 57a to the tubular shaft 57 and is thus in driving connection with the sun gear 51.

During operation of the transmission of FIG. 3, the differential gear 48 normally rotates with no differential action or with a relatively small degree of differential action during vehicle cornering and due to slight difference in effective road wheel diameters between front and rear. This relatively small degree of differential action involves relatively low values of speed difference between the annulus 50 and the sun gear 51, such speed differences developing a torque transmission value within the control coupling sufficiently low to constitute an insignificant impedance to the action of the differential gear 48. In the event of a tendency towards front or rear road wheel spin during drive or lock during braking, a relatively large degree of differential action in the differential gear 48 is opposed or limited by the development in the control coupling of a relatively high torque transmission value in the manner described above and which provides an effective coupling of the front and rear wheels and inhibits wheel spinning or locking. The transmission operates as described in both forward and reverse drive.

Should the vehicle find itself in a position in which relative rotation between the two sets of wheels takes place for some length of time then the torque transmitted by the coupling may decrease initially due to a drop in the viscosity of the fluid with rise in temperature and then will increase due to engagement of the plates 10 and 11 and ultimately to engagement of the clutch 31, 32. This increase may may be useful to extricate the vehicle from a difficult situation. Alternatively, if there is some failure in the drive to one of the pairs of wheels, the torque transmission between the parts of the coupling when the clutch 31, 32 is engaged will be such as to enable the vehicle to be driven only by the remaining pair of wheels since the coupling will provide a reaction member for the inter-axle differential.

I claim:

1. A control coupling comprising a liquid-tight enclosure, first and second sets of mutually interleaved elements within said enclosure and arranged for rotation about a common axis, a viscous liquid within said enclosure, said liquid being in contact with adjacent working surfaces of said elements, said first and second sets of elements being arranged for driving connection with first and second rotatable members respectively, a clutch outside said enclosure, resilient means urging said clutch to a disengaged state and pressure responsive means in communication with said enclosure and arranged to directly sense the level of liquid pressure in said enclosure, said pressure responsive means being arranged upon the attainment of a predetermined liquid pressure level in said enclosure to be displaced axially of the coupling by said predetermined pressure level thereby bringing said clutch into engagement against the action of said resilient means.

2. A coupling according to claim 1, in which each set of elements are free to move in directions parallel to said common axis.

3. A coupling according to claim 1 in which the elements of one of said sets are free to move in directions parallel to said common axis.

4. A coupling according to claim 3 in which said one set of elements are provided with working surfaces in the form of facings of friction material.

5. The combination of a control coupling as claimed in claim 1 with a differential gear in which said first and second sets of elements are drivingly connected to two relatively rotatable elements of said gear.

6. The combination according to claim 5 wherein said differential gear is of the spur gear type having a sun gear, planet gears and an annulus gear and wherein said control coupling is connected between the sun gear and the annulus gear.

7. A four-wheel-drive vehicle having front and rear driven axles and including the combination of a differential gear and control coupling according to claim 5, said differential gear having two outputs which are connected to said front and rear driven axles respectively.

8. A control coupling comprising a liquid-tight enclosure having relatively rotatable inner and outer concentric cylindrical walls with two annular end walls extending therebetween, first and second sets of mutually interleaved elements within said enclosure and arranged for rotation about a common axis, said first set of elements being carried by the inner cylindrical wall and said second set by said outer wall, a viscous liquid within said enclosure, said liquid being in contact with adjacent working surfaces of said elements, a clutch outside said enclosure, resilient means urging said clutch to a disengaged state, and one annular end wall of said enclosure being arranged to be slidable between said cylindrical walls upon the attainment of a predetermined liquid pressure level in said enclosure thereby bringing the clutch into engagement against the action of said resilient means.

9. A coupling according to claim 8 in which the resilient means comprises a spring ring engaging a groove in said one end wall, the groove being shaped to cause expansion of the ring and to permit movement of said one end wall when the total force on said end wall due to the pressure in said enclosure is sufficient to cause expansion of said ring.

10. A coupling according to claim 1 in which a cone clutch is provided and said one end wall is fixed against rotation relative to one of said cylindrical walls and carries one part of said cone clutch, the other part of said cone clutch being carried by the other cylindrical wall.

11. A coupling according to claim 10 in which a bearing is interposed between an abutment carried by said one cylindrical wall and said other part of the clutch.

* * * * *